(12) United States Patent
Sternowski

(10) Patent No.: US 10,396,908 B1
(45) Date of Patent: *Aug. 27, 2019

(54) HIGH FREQUENCY LINE FLATTENER IMPEDANCE MATCHING NETWORK

(71) Applicant: Softronics, Ltd., Marion, IA (US)

(72) Inventor: Robert H. Sternowski, Cedar Rapids, IA (US)

(73) Assignee: Softronics, Ltd., Marion, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/042,591

(22) Filed: Jul. 23, 2018

Related U.S. Application Data

(63) Continuation of application No. 15/634,717, filed on Jun. 27, 2017, now Pat. No. 10,063,326.

(60) Provisional application No. 62/360,614, filed on Jul. 11, 2016.

(51) Int. Cl.
| | | |
|---|---|---|
| *H04B 17/00* | (2015.01) | |
| *H04B 17/10* | (2015.01) | |
| *H04B 3/46* | (2015.01) | |
| *H04B 3/06* | (2006.01) | |
| *H04B 1/04* | (2006.01) | |

(52) U.S. Cl.
CPC .......... *H04B 17/104* (2015.01); *H04B 1/04* (2013.01); *H04B 3/06* (2013.01); *H04B 3/46* (2013.01)

(58) Field of Classification Search
CPC .......... H04B 17/104; H04B 1/04; H04B 3/06; H04B 3/46
USPC ............................................. 455/115.4
See application file for complete search history.

(56) References Cited

U.S. PATENT DOCUMENTS

| | | | |
|---|---|---|---|
| 7,675,385 B1 * | 3/2010 | Mulbrook | H01P 5/12 333/101 |
| 7,929,987 B2 | 4/2011 | Lee et al. | |
| 10,063,326 B1 * | 8/2018 | Sternowski | H04B 17/104 |

* cited by examiner

*Primary Examiner* — Sonny Trinh
(74) *Attorney, Agent, or Firm* — Shuttleworth & Ingersoll, PLC; Jason Sytsma

(57) ABSTRACT

An impedance matching network between a transmitter and an antenna. The impedance matching network comprises of a watt meter coupled to the transmitter for measuring a standing wave ratio ("SWR"). A first unbalanced to unbalanced transformer ("first unun") with an impedance ratio of N:1 is selectively coupled in series with the watt meter. A microprocessor is coupled to the watt meter for determining iteratively whether the first unun lowers the standing wave ratio ("SWR") in response to switching the first unun in and out of a series connection with the antenna.

15 Claims, 2 Drawing Sheets

HIGH FREQUENCY LINE FLATTENER IMPEDANCE MATCHING NETWORK

CROSS-REFERENCE TO RELATED APPLICATIONS

This application is a continuation of U.S. patent application Ser. No. 15/634,717 filed Jun. 27, 2017, which application claims priority to U.S. Provisional Application No. 62/360,614 filed on Jul. 11, 2016, the contents of both are incorporated by reference herein.

TECHNICAL FIELD

This disclosure is directed to a high-frequency impedance matching network, and more specifically, this disclosure is directed to an automatic tuning passive high-frequency broadband line flattener impedance matching network.

BACKGROUND INFORMATION

Most modern radio systems have 50-ohm impedance RF terminations. This refers to the transmitter output, the transmission lines, the receiver input, the antennas, etc. In any radio system, when all of the component system equipment has the same impedance, the Maximum Power Transfer Theorem is satisfied. The theorem simply states that the maximum possible power transfer between source and load is obtained when the source impedance and load impedance are equal. This is the basis of the 50 ohm RF transmission system which is the international standard. If the system has a 50-ohm impedance, then the system operates at near-perfect efficiency.

The measure of the "quality" of the impedance match, and hence the power transfer efficiency, is called Standing Wave Ratio ("SWR"). SWR is the ratio of impedances, expressed as SWR=ZSOURCE/ZLOAD. (If ZLOAD>ZSOURCE, then SWR=ZLOAD/ZSOURCE). An SWR ratio of 1:1 is perfect with 100% efficiency of power transfer. A system design attempts to get as close to a 1:1 SWR as possible. That said, a modern transmitter operates well when the load SWR is on the order of 1.3:1 to 1.5:1 or less.

An antenna coupler or line flattener can be used to match the 50-ohm output impedance of a transmitter to the actual impedance of an antenna by transforming the antenna impedance to 50 ohms via a passive electronic circuit. A line flattener is similar to an antenna coupler but there are important differences and specific advantages of a line flattener versus an antenna coupler. An antenna coupler has an impedance transformation range of 100:1 or more, and can transform very high standing wave ratio ("SWR") values of a resonant antenna (i.e., whip) to within the range of a transmitter's SWR capability. A line flattener can be viewed as a simplified antenna coupler with an impedance transformation range of 4:1 (typical), and transforms moderate SWR values of a wideband antenna to within the range of a transmitter's SWR capability. In this regard, the operating principles of an antenna coupler and a line flattener are similar, except that the transformation range, i.e., SWR transformation limits, differs between the two.

Prior art line flatteners have resulted in designs that are coarse antenna couplers, using discriminator tuning (that measures the actual complex radio frequency impedance of the antenna using a complex and expensive electronic subsystem) to give a coarse impedance match to present a low SWR at the selected frequency. This included all the complexity and cost burden of a classical antenna coupler.

Accordingly, there is a need for a more efficient and less complex line flattener with the advantages of an antenna coupler.

SUMMARY

In accordance with one aspect of this disclosure, is disclosed an impedance matching network between a transmitter and an antenna. The impedance matching network comprises of a watt meter coupled to the transmitter for measuring a standing wave ratio ("SWR"). A first unbalanced to unbalanced transformer ("first unun") with an impedance ratio of N:1 is selectively coupled in series with the watt meter. A microprocessor is coupled to the watt meter for determining iteratively whether the first unun lowers the standing wave ratio ("SWR") in response to switching the first unun in and out of a series connection with the antenna.

The impedance matching network can further comprise of a second unbalanced to unbalanced transformer ("second unun") selectively coupled in series with the watt meter and the antenna. In this instance, the microprocessor determines iteratively whether the first unun, the second unun, or neither the first unun and the second unun lowers the standing wave ratio ("SWR") in response to switching the first unun and the second unun in and out of series connection with the antenna.

The impedance matching network can further comprise a first portion of coaxial transmission line selectively switched into and out of a series connection between the watt meter and the first unun to provide additional impedance and tuning range. The first portion of coaxial transmission line can be 50-ohm coaxial cable. In other implementations, a plurality of portions of coaxial transmission line can be provided. Each of the portions of coaxial transmission line can be selectively switched into and out of series connection between the watt meter and the first unun to provide additional impedance and tuning range.

The impedance network can further comprise a memory module combined to the microprocessor for storing an antenna information and associating the antenna information with the determination of which one of the first unun, one or more of the plurality of portions of coaxial transmission line, or neither the first unun nor any of the plurality of portions of coaxial transmission line lowers the SWR in response to switching by the microprocessor of the first unun and each one of the plurality of portions of coaxial transmission line in and out of a series connection with an antenna. In this implementation the plurality of portions of coaxial transmission line can be replaced with the second unun or the second unun can be added to further lower the SWR of the impedance matching network.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
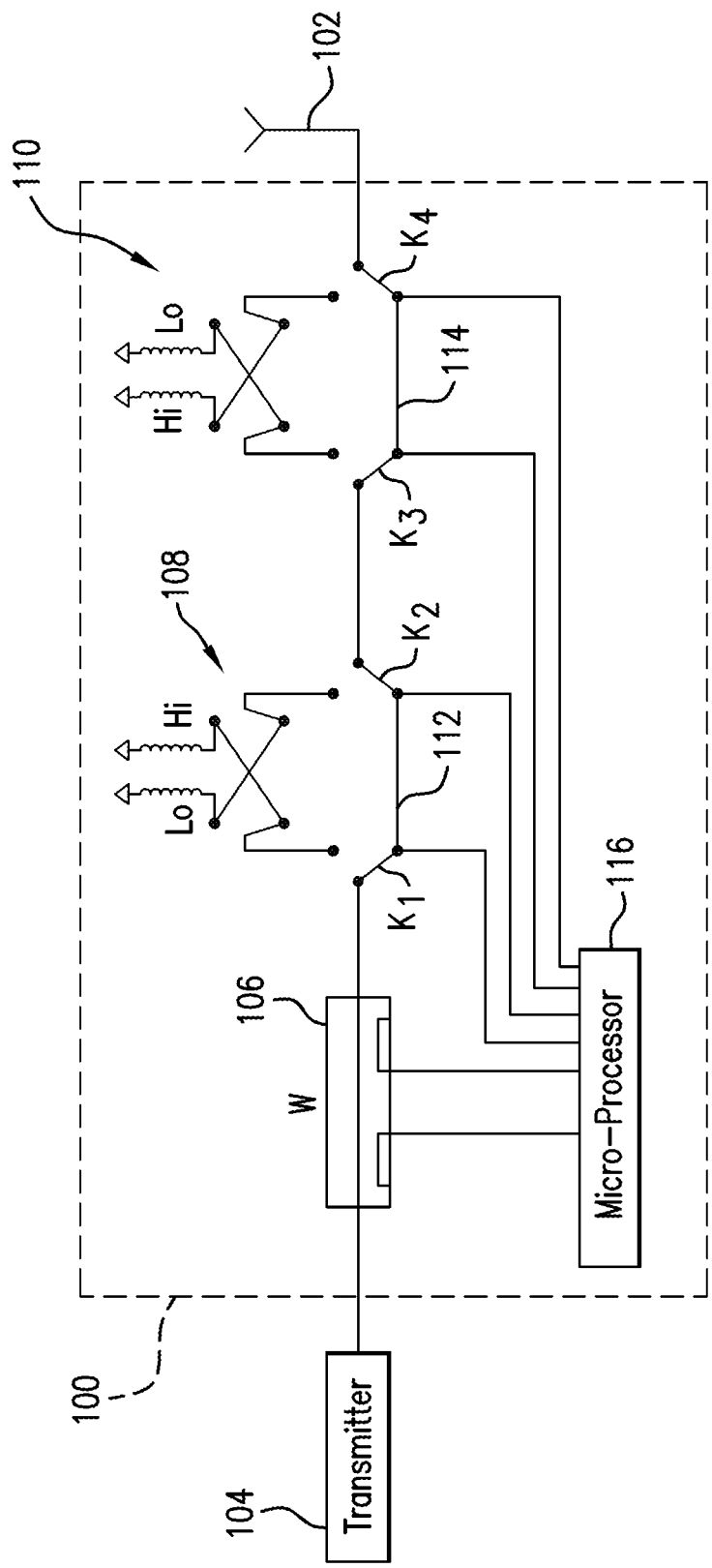
FIG. 1 is a schematic of one implementation of a line flattener according to this disclosure.
Figure 2:
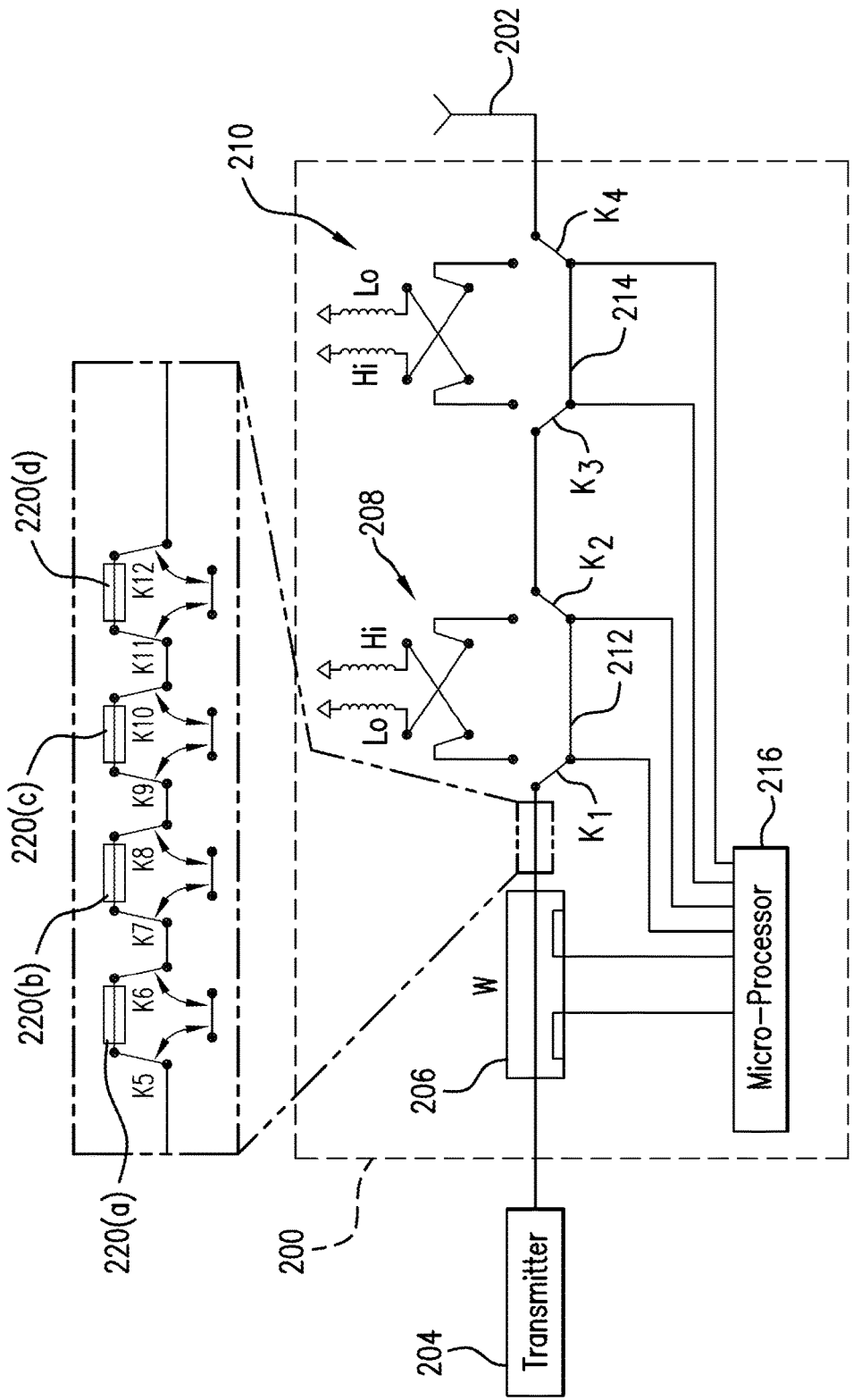
FIG. 2 is a schematic of another implementation of a line flattener according to this disclosure.

Referring to FIGS. 1 and 2, disclosed is an impedance matching network 100, also referred to as a line flattener.

Impedance matching network 100 is a passive broadband network designed to reduce the voltages standing wave ratio (VSWR) or (SWR) of a broadband antenna 102 from a typical level of 4:1 down to a VSWR of 1.5:1 or less, so that an automatic protection circuit of a transmitter 104 does not reduce the output power due to a high VSWR. Network 100 can be installed proximate to transmitter 104 or can be provided in a weather proof case for installation proximate to antenna 102.

More specifically, with reference to FIG. 1, impedance matching network 100 comprises of a watt meter 106 that is coupled to an output of transmitter 104 for measuring the VSWR of antenna 102. Watt meter 106 can be a high-performance watt meter with separate forward and reverse elements to measure the VSWR on the transmitter-side of a transmitter-antenna system. In this regard, the watt meter 106 is connected in series between transmitter 104 and antenna 106.

Impedance matching network 100 can have three settings of impedance transformation, low, medium, and high. These three attenuation settings are implemented by switching in and out a combination of two unbalanced to unbalanced transformers to either directly connect transmitter 104 to antenna 102, step transmitter impedance up, or step transmitter impedance down. One of these combinations will provide the lowest VSWR for a predetermined frequency.

The foregoing is more specifically implemented with a first unbalanced to unbalanced transformer ("first unun") 108 with impedance ratio N:1, a second unbalanced to unbalanced transformer ("second unun") 110, and a series of switches. First unun 108 and second unun 110 can be reversible bi-directional transformers with an unbalanced input and an unbalanced output.

First unun 108 and second unun 110 are switched in and out of the circuit by a combination of switches, k1, k2 and k3, k4 for first unun 108 and second unun 110, respectively. Switch k1 and switch k2 are operated together to either couple first unun 108 in series between transmitter 104 and antenna 102 or provide a short around first unun 108 via path 112 to remove first unun 108 from the series connection between transmitter 104 and antenna 102. Similarly, switch k3 and switch k4 are operated together to either couple second unun 110 in series between transmitter 104 and antenna 102 or provide a short around second unun 110 via path 114 to remove second unun 110 from the series connection between transmitter 104 and antenna 102.

Switches k1, k2, k3, and k4 are radio frequency switches characterized by low stray capacitance and sufficient voltage and current rating for the particular transmitter output power.

Impedance matching network 100 can be configured for automatic tuning to determine the setting that provides the lowest VSWR. The automatic tuning is enabled by a microprocessor 116. Microprocessor 116 is connected to watt meter 106 to measure forward and reflected samples of the power. The measured samples can be digitized by watt meter 106 or provided in analog form to microprocessor 116 for digitization. Thereafter, microprocessor 116 calculates and stores in a memory module the VSWR.

Microprocessor 16 is also connected to switches k1, k2, k3, and k4. Microprocessor can then iteratively switch in sequence each of the three states of impedance transformation (i.e., low, medium, and high) corresponding with: (i) directly connecting transmitter 104 to antenna 102 by directing the signal across path 112 and path 114 to remove first unun 108 and second unun 110 from the series connection; (ii) step transmitter impedance up by directing the signal into first unun 108 to step the signal up and then across path 114 to remove second unun 110 from the series connection; or (iii) step transmitter impedance down by directing the signal across path 112 to remove first unun 108 from the series connection and into second unun 110 to step the signal down. One of these combinations will provide the lowest VSWR for a predetermined frequency.

For each of the three iterative combinations, watt meter 106 measures the power and microprocessor 116 calculates, stores and then compares the VSWR for each of the three combinations to determine which combination provides the lowest VSWR for the frequency and then locks that combination in.

Microprocessor 116 can have a memory module for storing antenna information, which is information about the antenna including the type, make, model, etc, and then associating the antenna information with which one of the foregoing combinations provides the lowest VSWR for the frequency. This way the iterative process does not need to be repeated for future uses of that particular antenna.

FIG. 2 shows impedance matching network 200, which is another implementation of the network described above. In this implementation, the foregoing description applies, except that several switched sections of 50-ohm coaxial transmission line 120(a), 120(b), 120(c), and 120(d) have been added between transmitter 204 and first unun 208. Adding a section of series coaxial transmission lines 220(a), 220(b), 220(c), and 220(d) has the system benefit of rotating the impedance of antenna 202 to a potentially lower SWR value by virtue of the resonant impedance of the transmission line at the transmitter frequency. More or fewer sections of series coaxial transmission lines can be included depending on the desired SWR value. The series of coaxial transmission lines 220(a), 220(b), 220(c), and 220(d) are switched in and out by corresponding switch pairs K5, K6; K7, K8; K9, K10; and K11, K12. Otherwise, watt meter 206, first unun 208 and second unun 210, and microprocessor 216 can operate in a manner similar to their counterparts as described above in connection with FIG. 1, stepping through each combination of impedance network ratio WITH each combination of coaxial line lengths to obtain the lowest possible SWR. It is also recognized that one or more coaxial transmission lines 220(a), 220(b), 220(c), and 220(d) can replace second unun 210.

Impedance matching network 100 and impedance matching network 200 can be fit into a variety of mechanical packages suitable for use with a variety of transmitter-antenna systems. The chassis can be made waterproof to locate the device outdoors proximate to the antenna or in a simple unsealed case for use proximate to an indoor transmitter. The package also includes necessary power supplies with regulators to provide the components with their required power and cooling fans to cool the transformers, if necessary.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. An impedance matching network between a transmitter and an antenna, the impedance matching network comprising:

a measurement device for measuring a standing wave ratio coupled to the transmitter for measuring a standing wave ratio ("SWR");

a first unbalanced to unbalanced transformer ("first unun") with an impedance ratio of N:1 selectively coupled in series with the measurement device;

a microprocessor coupled to the measurement device for determining iteratively whether the first unun lowers the standing wave ratio ("SWR") in response to switching the first unun in and out of a series connection with the antenna, wherein one of the iterations comprises of a direct series connection between the measurement device and the antenna with a short around the first unun.

2. The impedance matching network of claim 1, and further comprising a second unbalanced to unbalanced transformer ("second unun") selectively coupled in series with the measurement device and the antenna.

3. The impedance matching network of claim 2, wherein the microprocessor determines iteratively whether the first unun, the second unun, or neither the first unun and the second unun lowers the standing wave ratio ("SWR") in response to switching the first unun and the second unun in and out of series connection with the antenna.

4. The impedance matching network of claim 2, and further comprising a first switch between the measurement device and the first unun to selectively couple the measurement device with the first unun, a second switch and a third switch positioned in series with each other to selectively couple the first unun to the second unun, and a fourth switch to selectively couple the second unun to the antenna.

5. The impedance matching network of claim 4, wherein the first switch, the second switch, the third switch, and the fourth switch are communicatively connected to the microprocessor for control by the microprocessor to iteratively to switching the first unun and the second unun in and out of the series connection with the antenna.

6. The impedance matching network of claim 5, wherein the first switch and the second switch are operatively joined together to either couple the first unun in series between the transmitter and the antenna or provide a short around the first unun to remove the first unun from the series.

7. The impedance matching network of claim 6, wherein the third switch and the fourth switch are operatively joined together to either couple the second unun in series between the transmitter and the antenna or provide a short around the second unun to remove the second unun from the series.

8. The impedance matching network of claim 1, and further comprising a first switch between the measurement device and the first unun to selectively couple the measurement device with the first unun and a second switch positioned between the first unun and the antenna to selectively couple the first unun to the antenna.

9. The impedance matching network of claim 1, and further comprising a memory module combined to the microprocessor for storing an antenna information and associating the antenna information with the determination of whether the first unun lowers the SWR in response to switching by the microprocessor of the first unun in and out of a series connection with an antenna.

10. The impedance matching network of claim 1, and further comprising a memory module combined to the microprocessor for storing an antenna information and associating the antenna information with the determination of which one of the first unun, the second unun, both the first unun and the second unun, or neither the first unun and the second unun lowers the SWR in response to switching by the microprocessor of the first unun and the second unun in and out of a series connection with an antenna.

11. The impedance matching network of claim 1, and further comprising a first portion of coaxial transmission line selectively switched into and out of a series connection between the measurement device and the first unun to provide additional impedance and tuning range.

12. The impedance matching network of claim 11, wherein the first portion of coaxial transmission line is 50 ohm coaxial cable.

13. The impedance network of claim 11, and further comprising a plurality of portions of coaxial transmission line each of which selectively switched into and out of a series connection between the measurement device and the first unun to provide additional impedance and tuning range.

14. The impedance network of claim 13, and further comprising a second unbalanced to unbalanced transformer ("second unun") selectively coupled in series with the measurement device and the antenna.

15. The impedance network of claim 13, and further comprising a memory module combined to the microprocessor for storing an antenna information and associating the antenna information with the determination of which one of the first unun, one or more of the plurality of portions of coaxial transmission line, or neither the first unun nor any of the plurality of portions of coaxial transmission line lowers the SWR in response to switching by the microprocessor of the first unun and each one of the plurality of portions of coaxial transmission line in and out of a series connection with an antenna.

* * * * *